United States Patent
Saydag

(10) Patent No.: US 11,475,680 B2
(45) Date of Patent: Oct. 18, 2022

(54) CARGO SENSOR SYSTEM IMPLEMENTED USING NEURAL NETWORK

(71) Applicant: Spireon, Inc., Irvine, CA (US)

(72) Inventor: Sait C. Saydag, Mission Viejo, CA (US)

(73) Assignee: Spireon, Inc., Irvine, CA (US)

( * ) Notice: Subject to any disclaimer, the term of this patent is extended or adjusted under 35 U.S.C. 154(b) by 399 days.

(21) Appl. No.: 16/708,505

(22) Filed: Dec. 10, 2019

(65) Prior Publication Data

US 2020/0193196 A1    Jun. 18, 2020

Related U.S. Application Data

(60) Provisional application No. 62/778,553, filed on Dec. 12, 2018.

(51) Int. Cl.

| | |
|---|---|
| *G06V 20/59* | (2022.01) |
| *H04W 4/38* | (2018.01) |
| *G06V 20/52* | (2022.01) |
| *G06V 10/74* | (2022.01) |
| *G06V 10/75* | (2022.01) |
| *B60R 1/00* | (2022.01) |
| *G01S 5/14* | (2006.01) |

(Continued)

(52) U.S. Cl.
CPC ............... *G06V 20/59* (2022.01); *B60R 1/00* (2013.01); *G01S 5/14* (2013.01); *G01S 7/4865* (2013.01); *G06N 3/0472* (2013.01); *G06Q 10/087* (2013.01); *G06Q 50/28* (2013.01); *G06V 10/74* (2022.01); *G06V 10/75* (2022.01); *G06V 20/52* (2022.01); *H04W 4/38* (2018.02); *G06T 2207/10028* (2013.01); *G06T 2207/30268* (2013.01)

(58) Field of Classification Search
CPC ... B60R 1/00; G01S 5/14; G01S 17/88; G01S 7/4865; G06N 3/0472; G06N 3/0454; G06N 3/08; G06Q 10/087; G06Q 50/28; H04W 4/38; G06K 9/6262; G06K 9/6273; G06T 2207/10028; G06T 2207/30268; G06V 10/74; G06V 10/75; G06V 20/52; G06V 20/59; H04L 67/12
USPC ........................................................ 348/148
See application file for complete search history.

(56) References Cited

U.S. PATENT DOCUMENTS

| 906,021 A | 12/1908 | Herrick |
|---|---|---|
| 4,633,407 A | 12/1986 | Freienstein et al. |

(Continued)

FOREIGN PATENT DOCUMENTS

| CA | 2609106 A1 | 10/2008 |
|---|---|---|
| CA | 2683208 A1 | 11/2008 |

(Continued)

*Primary Examiner* — Christopher S Kelley
*Assistant Examiner* — Kathleen M Walsh
(74) *Attorney, Agent, or Firm* — Luedeka Neely Group, P.C.

(57) ABSTRACT

A cargo sensor system incorporates an optical cargo sensor to supply images to a convolutional neural network. In preferred embodiments, the neural network is implemented using a processor in a sensor module, and is trained by a machine learning system to determine the load state of the cargo container. Some embodiments also include a secondary sensor, such as a laser-ranging Time-of-Flight (ToF) sensor, that verifies the cargo reading determined by the optical cargo sensor.

14 Claims, 3 Drawing Sheets

(51) Int. Cl.
  *G01S 7/4865*  (2020.01)
  *G06Q 10/08*  (2012.01)
  *G06Q 50/28*  (2012.01)
  *G06N 3/04*  (2006.01)

(56) References Cited

U.S. PATENT DOCUMENTS

| | | |
|---|---|---|
| 4,837,700 A | 6/1989 | Ando et al. |
| 5,119,301 A | 6/1992 | Shimizu et al. |
| 5,289,369 A | 2/1994 | Hirshberg |
| 5,299,132 A | 3/1994 | Wortham |
| 5,307,277 A | 4/1994 | Hirano |
| 5,870,029 A | 2/1999 | Otto et al. |
| 5,877,956 A | 3/1999 | Frank et al. |
| 6,025,774 A | 2/2000 | Forbes |
| 6,240,365 B1 | 5/2001 | Bunn |
| 6,249,217 B1 | 6/2001 | Forbes |
| 6,510,381 B2 | 1/2003 | Grounds et al. |
| 6,512,465 B2 | 1/2003 | Flick |
| 6,701,234 B1 | 3/2004 | Vogelsang |
| 6,771,970 B1 | 8/2004 | Dan |
| 6,816,090 B2 | 11/2004 | Teckchandani et al. |
| 6,930,638 B2 | 8/2005 | Lloyd et al. |
| 6,931,309 B2 | 8/2005 | Phelan et al. |
| 6,985,087 B2 | 1/2006 | Soliman |
| 7,034,683 B2 | 4/2006 | Ghazarian |
| 7,091,835 B2 | 8/2006 | Boulay et al. |
| 7,102,510 B2 | 9/2006 | Boling et al. |
| 7,170,390 B2 | 1/2007 | Quiñones et al. |
| 7,174,243 B1 | 2/2007 | Lightner et al. |
| 7,177,738 B2 | 2/2007 | Diaz |
| 7,215,282 B2 | 5/2007 | Boling et al. |
| 7,266,378 B2 | 9/2007 | Norta et al. |
| 7,346,439 B2 | 3/2008 | Bodin |
| 7,366,551 B1 | 4/2008 | Hartley |
| 7,405,658 B2 | 7/2008 | Richards |
| 7,546,151 B2 | 6/2009 | Hartley |
| 7,574,195 B2 | 8/2009 | Krasner et al. |
| 7,593,999 B2 | 9/2009 | Nathanson |
| 7,675,423 B2 | 3/2010 | Boling et al. |
| 7,701,363 B1 | 4/2010 | Zlojutro |
| 7,725,216 B2 | 5/2010 | Kim |
| 7,817,033 B2 | 10/2010 | Motoyama |
| 7,818,098 B2 | 10/2010 | Koepf et al. |
| 7,830,305 B2 | 11/2010 | Boling et al. |
| 7,893,818 B2 | 2/2011 | Smoyer et al. |
| 7,970,496 B2 | 6/2011 | Koepf et al. |
| 8,018,332 B2 | 9/2011 | Boling et al. |
| 8,126,601 B2 | 2/2012 | Kapp et al. |
| 8,237,591 B2 | 8/2012 | Holcomb et al. |
| 8,330,626 B1 | 12/2012 | Adelson |
| 8,330,817 B1 | 12/2012 | Foster |
| 8,368,561 B2 | 2/2013 | Welch et al. |
| 8,452,673 B2 | 5/2013 | Boling et al. |
| 8,462,021 B2 | 6/2013 | Welch et al. |
| 8,510,200 B2 | 8/2013 | Pearlman et al. |
| 8,527,135 B2 | 9/2013 | Lowrey et al. |
| 8,565,963 B2 | 10/2013 | Burke |
| 8,612,137 B2 | 12/2013 | Harris et al. |
| 8,626,152 B2 | 1/2014 | Farrell et al. |
| 8,655,544 B2 | 2/2014 | Fletcher et al. |
| 8,671,063 B2 | 3/2014 | Ehrman et al. |
| 8,725,326 B2 | 5/2014 | Kapp et al. |
| 8,760,274 B2 | 6/2014 | Boling et al. |
| 8,799,461 B2 | 8/2014 | Herz et al. |
| 8,933,802 B2 | 1/2015 | Baade |
| 8,970,701 B2 | 3/2015 | Lao |
| 9,008,894 B2 | 4/2015 | Bishop et al. |
| 9,049,564 B2 | 6/2015 | Muetzel et al. |
| 9,060,213 B2 | 6/2015 | Jones |
| 9,070,271 B2 | 6/2015 | Baade et al. |
| 9,316,737 B2 | 4/2016 | Baade |
| 9,332,404 B2 | 5/2016 | Boling et al. |
| 9,516,394 B2 | 12/2016 | Carlo et al. |
| 9,551,788 B2 | 1/2017 | Epler |
| 9,779,379 B2 | 10/2017 | Hall et al. |
| 9,779,449 B2 | 10/2017 | Meyer et al. |
| 10,089,598 B2 | 10/2018 | Reeder et al. |
| 10,169,822 B2 | 1/2019 | Jarvis et al. |
| 10,185,892 B1* | 1/2019 | Mishra ............. G06K 9/6281 |
| 10,223,744 B2 | 3/2019 | Brady et al. |
| 10,232,823 B1 | 3/2019 | Bobay et al. |
| 10,255,824 B2 | 4/2019 | Pearlman et al. |
| 10,311,315 B2 | 6/2019 | Drazan et al. |
| 10,789,789 B1* | 9/2020 | Edman ................. G05D 1/12 |
| 2001/0018639 A1 | 8/2001 | Bunn |
| 2001/0034577 A1 | 10/2001 | Grounds et al. |
| 2002/0000916 A1 | 1/2002 | Richards |
| 2002/0014978 A1 | 2/2002 | Flick |
| 2002/0059126 A1 | 5/2002 | Ricciardi |
| 2002/0082025 A1 | 6/2002 | Baese et al. |
| 2002/0184062 A1 | 12/2002 | Diaz |
| 2002/0186144 A1 | 12/2002 | Meunier |
| 2003/0083060 A1 | 5/2003 | Menendez |
| 2003/0151501 A1 | 8/2003 | Teckchandani et al. |
| 2003/0151507 A1 | 8/2003 | Andre et al. |
| 2003/0174067 A1 | 9/2003 | Soliman |
| 2004/0093291 A1 | 5/2004 | Bodin |
| 2004/0125217 A1* | 7/2004 | Jesson ............. G06Q 10/087 |
| | | 348/231.3 |
| 2004/0130440 A1 | 7/2004 | Boulay et al. |
| 2004/0143378 A1 | 7/2004 | Vogelsang |
| 2004/0162063 A1 | 8/2004 | Quinones et al. |
| 2004/0225557 A1 | 11/2004 | Phelan et al. |
| 2004/0246177 A1 | 12/2004 | Lloyd et al. |
| 2005/0021199 A1 | 1/2005 | Zimmerman et al. |
| 2005/0026627 A1 | 2/2005 | Boling et al. |
| 2005/0134504 A1 | 6/2005 | Harwood et al. |
| 2005/0215194 A1 | 9/2005 | Boling et al. |
| 2005/0237166 A1 | 10/2005 | Chen |
| 2006/0007038 A1 | 1/2006 | Boling et al. |
| 2006/0055561 A1 | 3/2006 | Kamali et al. |
| 2006/0087411 A1 | 4/2006 | Chang |
| 2006/0129290 A1 | 6/2006 | Zimmerman et al. |
| 2007/0013779 A1 | 1/2007 | Gin et al. |
| 2007/0050332 A1 | 3/2007 | Grenzberg et al. |
| 2007/0152844 A1 | 7/2007 | Hartley et al. |
| 2007/0167147 A1 | 7/2007 | Krasner et al. |
| 2007/0206856 A1 | 9/2007 | Matsuda et al. |
| 2007/0290923 A1 | 12/2007 | Norta et al. |
| 2008/0015748 A1 | 1/2008 | Nagy |
| 2008/0147245 A1 | 6/2008 | Koepf et al. |
| 2008/0162045 A1 | 7/2008 | Lee |
| 2008/0176537 A1 | 7/2008 | Smoyer et al. |
| 2008/0186135 A1 | 8/2008 | Boling et al. |
| 2008/0198018 A1 | 8/2008 | Hartley |
| 2008/0278314 A1 | 11/2008 | Miller et al. |
| 2008/0287151 A1 | 11/2008 | Fjelstad et al. |
| 2008/0288768 A1 | 11/2008 | Barowski et al. |
| 2008/0294302 A1 | 11/2008 | Basir |
| 2009/0027500 A1 | 1/2009 | Elangovan et al. |
| 2009/0043445 A1 | 2/2009 | Bishop et al. |
| 2009/0079591 A1 | 3/2009 | Motoyama |
| 2009/0112394 A1 | 4/2009 | Lepejian et al. |
| 2009/0112630 A1 | 4/2009 | Collins, Jr. et al. |
| 2009/0140887 A1 | 6/2009 | Breed et al. |
| 2009/0224966 A1 | 9/2009 | Boling et al. |
| 2009/0287369 A1 | 11/2009 | Nielsen |
| 2010/0094482 A1 | 4/2010 | Schofield et al. |
| 2010/0103042 A1 | 4/2010 | Bishop et al. |
| 2010/0117868 A1 | 5/2010 | Wiemeersch et al. |
| 2010/0191412 A1 | 7/2010 | Kim |
| 2010/0265104 A1 | 10/2010 | Zlojutro |
| 2010/0299020 A1 | 11/2010 | Koepf et al. |
| 2011/0016514 A1 | 1/2011 | Carlo et al. |
| 2011/0090075 A1 | 4/2011 | Armitage et al. |
| 2011/0093159 A1 | 4/2011 | Boling et al. |
| 2011/0143669 A1 | 6/2011 | Farrell et al. |
| 2011/0227722 A1 | 9/2011 | Salvat |
| 2011/0241903 A1 | 10/2011 | Welch et al. |
| 2012/0041618 A1 | 2/2012 | Sun et al. |
| 2012/0077475 A1 | 3/2012 | Holcomb et al. |
| 2012/0078497 A1 | 3/2012 | Burke |
| 2012/0197484 A1 | 8/2012 | Nath et al. |

(56) References Cited

U.S. PATENT DOCUMENTS

| | | |
|---|---|---|
| 2012/0299721 A1 | 11/2012 | Jones |
| 2012/0299755 A1 | 11/2012 | Jones |
| 2013/0059607 A1 | 3/2013 | Herz et al. |
| 2013/0066757 A1 | 3/2013 | Lovelace et al. |
| 2013/0088371 A1 | 4/2013 | Welch et al. |
| 2013/0100286 A1 | 4/2013 | Lao |
| 2013/0113637 A1 | 5/2013 | Sin et al. |
| 2013/0127617 A1 | 5/2013 | Baade et al. |
| 2013/0141249 A1 | 6/2013 | Pearlman et al. |
| 2013/0144667 A1 | 6/2013 | Ehrman et al. |
| 2013/0144770 A1 | 6/2013 | Boling et al. |
| 2013/0144771 A1 | 6/2013 | Boling et al. |
| 2013/0144805 A1 | 6/2013 | Boling et al. |
| 2013/0147617 A1 | 6/2013 | Boling et al. |
| 2013/0159214 A1 | 6/2013 | Boling et al. |
| 2013/0185193 A1 | 7/2013 | Boling et al. |
| 2013/0249713 A1 | 9/2013 | Adelson |
| 2013/0297199 A1 | 11/2013 | Kapp et al. |
| 2013/0302757 A1 | 11/2013 | Pearlman et al. |
| 2014/0012634 A1 | 1/2014 | Pearlman et al. |
| 2014/0036072 A1 | 2/2014 | Lyall et al. |
| 2014/0052605 A1 | 2/2014 | Beerle et al. |
| 2014/0074692 A1 | 3/2014 | Beerle et al. |
| 2014/0095061 A1 | 4/2014 | Hyde |
| 2014/0125500 A1 | 5/2014 | Baade |
| 2014/0125501 A1 | 5/2014 | Baade |
| 2014/0220966 A1 | 8/2014 | Muetzel et al. |
| 2014/0267688 A1 | 9/2014 | Aich et al. |
| 2014/0280658 A1 | 9/2014 | Boling et al. |
| 2015/0006207 A1 | 1/2015 | Jarvis et al. |
| 2015/0019270 A1 | 1/2015 | Jarvis et al. |
| 2015/0024727 A1 | 1/2015 | Hale-Pletka et al. |
| 2015/0032291 A1 | 1/2015 | Lowrey et al. |
| 2015/0066362 A1 | 3/2015 | Meyer et al. |
| 2015/0067312 A1 | 3/2015 | Lewandowski et al. |
| 2015/0095255 A1 | 4/2015 | Hall et al. |
| 2015/0168173 A1 | 6/2015 | Lewis-Evans et al. |
| 2015/0172518 A1 | 6/2015 | Lucas et al. |
| 2015/0186991 A1 | 7/2015 | Meyer et al. |
| 2015/0260529 A1 | 9/2015 | Petersen |
| 2015/0332525 A1 | 11/2015 | Harris et al. |
| 2015/0356497 A1 | 12/2015 | Reeder et al. |
| 2015/0373487 A1 | 12/2015 | Miller et al. |
| 2016/0225072 A1 | 8/2016 | Brady et al. |
| 2016/0282466 A1 | 9/2016 | Epler |
| 2017/0262717 A1 | 9/2017 | Drazan et al. |
| 2017/0313269 A1* | 11/2017 | Breed .................. G06F 3/0233 |
| 2018/0300967 A1 | 10/2018 | Winograd |
| 2018/0352198 A1 | 12/2018 | Raasch et al. |
| 2019/0005442 A1 | 1/2019 | Reeder et al. |
| 2019/0061692 A1 | 2/2019 | Bobay et al. |
| 2019/0114577 A1* | 4/2019 | Kilburn .................. G06Q 50/28 |
| 2019/0122173 A1* | 4/2019 | Souder .................. G06V 20/52 |
| 2019/0279494 A1 | 9/2019 | Raasch et al. |
| 2020/0014888 A1* | 1/2020 | Magal ..................... H04N 7/188 |
| 2020/0105008 A1* | 4/2020 | Ehrman .................... G06T 7/62 |
| 2021/0319582 A1* | 10/2021 | Sangeneni ............. G06Q 50/28 |

FOREIGN PATENT DOCUMENTS

| | | | |
|---|---|---|---|
| CA | 2837320 A1 | 11/2012 | |
| CA | 2856796 A1 | 5/2013 | |
| CA | 2867447 A1 | 9/2013 | |
| CA | 2826902 A1 | 3/2014 | |
| CA | 2828835 A1 | 4/2014 | |
| CA | 2832185 A1 | 5/2014 | |
| CA | 2846134 A1 | 9/2014 | |
| CN | 2921908 | 7/2007 | |
| CN | 101240734 A | 8/2008 | |
| CN | 101734228 A | 6/2010 | |
| CN | 101192322 B | 7/2012 | |
| CN | 102779407 A | 11/2012 | |
| CN | 103813477 A | 5/2014 | |
| CN | 104931066 A | 9/2015 | |
| DE | 4423328 A1 | 1/1996 | |
| EP | 0096252 A3 | 5/1987 | |
| EP | 0451482 A1 | 10/1991 | |
| EP | 0519630 A2 | 12/1992 | |
| EP | 0393935 B1 | 3/1995 | |
| EP | 0744727 A3 | 2/1997 | |
| EP | 1191500 A1 | 3/2002 | |
| EP | 1384635 A1 | 1/2004 | |
| EP | 2418461 A1 | 2/2012 | |
| JP | 2006123891 A | 5/2006 | |
| JP | 2014170000 A | 9/2014 | |
| KR | 20100109283 A | * 10/2010 | ............ G08G 1/017 |
| MX | 2009011420 A | 3/2010 | |
| MX | 2010001545 A | 8/2010 | |
| WO | 1984001823 A1 | 5/1984 | |
| WO | 1999063357 A1 | 12/1999 | |
| WO | 2000070530 A1 | 11/2000 | |
| WO | 2001024393 A1 | 4/2001 | |
| WO | 2001059601 A1 | 8/2001 | |
| WO | 2002089077 A1 | 11/2002 | |
| WO | 2003034089 A2 | 4/2003 | |
| WO | 2003036462 A1 | 5/2003 | |
| WO | 2003079717 A2 | 9/2003 | |
| WO | 2003012473 | 3/2004 | |
| WO | 2004075090 A1 | 9/2004 | |
| WO | 2004102536 A3 | 6/2005 | |
| WO | 2005086933 A2 | 9/2005 | |
| WO | 2006028995 A2 | 3/2006 | |
| WO | 2006028995 A3 | 2/2007 | |
| WO | 2007146449 A2 | 12/2007 | |
| WO | 2008034097 A2 | 3/2008 | |
| WO | 2007146449 A3 | 10/2008 | |
| WO | 2008121612 A1 | 10/2008 | |
| WO | 2008141456 A1 | 11/2008 | |
| WO | 2008144411 A1 | 11/2008 | |
| WO | 2005086933 A3 | 12/2008 | |
| WO | 2009021117 A1 | 2/2009 | |
| WO | 2009058972 A3 | 7/2009 | |
| WO | 2009097595 A1 | 8/2009 | |
| WO | 2010047887 A2 | 4/2010 | |
| WO | 2012162358 A1 | 11/2012 | |
| WO | 2012162450 A1 | 11/2012 | |
| WO | 2013078291 A1 | 5/2013 | |
| WO | 2013138798 A1 | 9/2013 | |
| WO | 2014008752 A1 | 1/2014 | |
| WO | 2016061355 A1 | 4/2016 | |

* cited by examiner

CARGO SENSOR SYSTEM IMPLEMENTED USING NEURAL NETWORK

RELATED APPLICATIONS

This nonprovisional application claims priority to provisional patent application Ser. No. 62/778,553 filed Dec. 12, 2018, titled Neural Network Based Cargo Occupancy Sensor, the entire contents of which are incorporated herein by reference.

FIELD

This invention relates to the field of cargo transportation. More particularly, this invention relates to a system for providing a cargo occupancy reading to indicate the load status of a cargo container, such as a cargo trailer.

BACKGROUND

Knowledge of the location and loading state of cargo containers, such as cargo trailers, is important to cargo carriers. If a dispatcher knows that there is room to accept more cargo in a particular trailer that is en route to a destination, the dispatcher can divert the trailer to pick up a load at a nearby customer's facility. In this way, owners of trailers can make more efficient use of their assets, thereby increasing profitability and reducing waste.

Previous solutions have implemented ultrasonic sensors to detect cargo within a cargo container. Such sensors often provide false readings, because pieces of cargo having soft outer materials cannot be reliably detected by ultrasonic sensors.

Some prior optical cargo detection and analysis systems have relied on standard image processing algorithms, such as contrast detection and edge detection, to determine the load status of trailers. In situations in which the load conditions in the trailer are unknown, and these optical methods can lead to false results.

What is needed, therefore, is a cargo sensor system that can be used on a cargo trailer or other cargo container to determine the cargo loading state without reliance on ultrasonic sensors or standard image processing algorithms.

SUMMARY

The above and other needs are met by a cargo sensor system that uses an optical cargo sensor, which may be camera-based (also referred to herein as an imaging sensor), that supplies images to a convolutional neural network. In preferred embodiments, the neural network is implemented using a processor in a sensor module, and is trained by a machine learning system to determine the load state of the cargo container. Some embodiments also include a secondary sensor, such as a laser-ranging Time-of-Flight (ToF) sensor, that verifies the cargo reading determined by the optical cargo sensor. This sensor combination results in much higher accuracy.

Embodiments of the cargo sensor system described herein may include an apparatus for detecting cargo within a cargo container. The apparatus preferably includes an optical sensor, memory, and a processor. The optical sensor captures an image of an interior space within the cargo container. The memory stores a neural network file which comprises neural network descriptions (layers, nodes, connections, and operations), weights, and biases. The neural network file is also referred to herein as a model file. The processor accesses the model file from the memory and processes the image from the optical sensor based on the model file to determine a first cargo loading status of the cargo container.

In some embodiments, the apparatus includes a network interface for communicating cargo information via a data communication network from the apparatus to a server computer. The cargo information may include the first cargo loading status or the image from the optical sensor or both.

In some embodiments, the apparatus includes a distance sensor that generates distance information indicative of the presence of cargo within the interior space of the cargo container. The processor of these embodiments receives the distance information and determines a second cargo loading status based at least in part on the distance information. The processor compares the first cargo loading status to the second cargo loading status, and generates an alert message if the first cargo loading status is inconsistent with the second cargo loading status.

In another aspect, embodiments described herein provide a method for detecting cargo within a cargo container. A preferred embodiment of the method includes the following steps:
  (a) capturing one or more images of an interior space of the cargo container using the one or more image sensors mounted within or on the cargo container;
  (b) processing the one or more images based on a model file to determine a first cargo loading status of the cargo container, wherein the processing is performed by a processor disposed within or on the cargo container; and
  (c) communicating cargo information via a data communication network to a server computer that is remote from the cargo container, wherein the cargo information includes one or both of the first cargo loading status and at least one of the images.

In some embodiments, the method includes (d) generating distance information indicative of the presence of cargo within the interior space of the cargo container using a distance sensor disposed on or within the housing, and (e) determining a second cargo loading status based at least in part on the distance information. Step (c) in these embodiments includes communicating the cargo information including the second cargo loading status.

In some embodiments, the method includes (d) comparing the first cargo loading status to the second cargo loading status, and (e) generating an alert message if the first cargo loading status is inconsistent with the second cargo loading status. Step (c) in these embodiments includes communicating the cargo information including the alert message.

In some embodiments, the method includes:
  (d) prior to step (b), capturing a plurality of images of interior spaces of a plurality of cargo containers using image sensors mounted within or on the plurality of cargo containers;
  (e) prior to step (b), generating image categorization information based on categorizing each of the plurality of images as depicting either a loaded cargo container or an unloaded cargo container; and
  (f) prior to step (b), generating a neural network model based on the image categorization information, wherein the neural network model incorporates the model file.
Step (b) in these embodiments includes processing the one or more images using the neural network model.

In some embodiments, step (b) includes selecting an optimal image from the one or more images for processing.

In some embodiments, step (b) includes calculating a probability distribution of the likelihood that the cargo container is loaded with cargo.

In some embodiments, the probability distribution has a value of zero to one, and step (b) includes determining that
the first cargo loading status is loaded if the value of the probability distribution is between zero and a lower threshold value, and
the first cargo loading status is unloaded if the value of the probability distribution is between an upper threshold value and one.

In some embodiments, if the value of the probability distribution is between the lower threshold value and the upper threshold value, the method includes (d) generating distance information indicative of the presence of cargo within the interior space of the cargo container using a distance sensor disposed on or within the housing, and (e) determining a second cargo loading status based at least in part on the distance information. Step (c) in these embodiments includes communicating the cargo information including the second cargo loading status.

In yet another aspect, embodiments described herein provide a cargo sensor module for determining a cargo loading status of a cargo container. In a preferred embodiment, the cargo sensor module includes an optical sensor, a distance sensor, memory, a processor, and a network interface. The optical sensor captures an image of an interior space within the cargo container. The distance sensor generates distance information indicative of the presence of cargo within the interior space of the cargo container. The memory stores a model file. The processor executes operational instructions to:
access the model file from the memory and process the image from the optical sensor based on the model file to determine a first cargo loading status of the cargo container;
receive the distance information and determine a second cargo loading status based at least in part on the distance information; and
compare the first cargo loading status to the second cargo loading status, and generate an alert message if the first cargo loading status is inconsistent with the second cargo loading status.

The network interface communicates cargo information via a data communication network from the apparatus to a server computer. The cargo information may include the alert message, the first cargo loading status, the second cargo loading status, the image from the optical sensor, or the distance information, or any combination thereof.

BRIEF DESCRIPTION OF THE DRAWINGS

Other embodiments of the invention will become apparent by reference to the detailed description in conjunction with the figures, wherein elements are not to scale, so as to more clearly show the details, wherein like reference numbers indicate like elements throughout the several views, and wherein.

DETAILED DESCRIPTION

Figure 1:
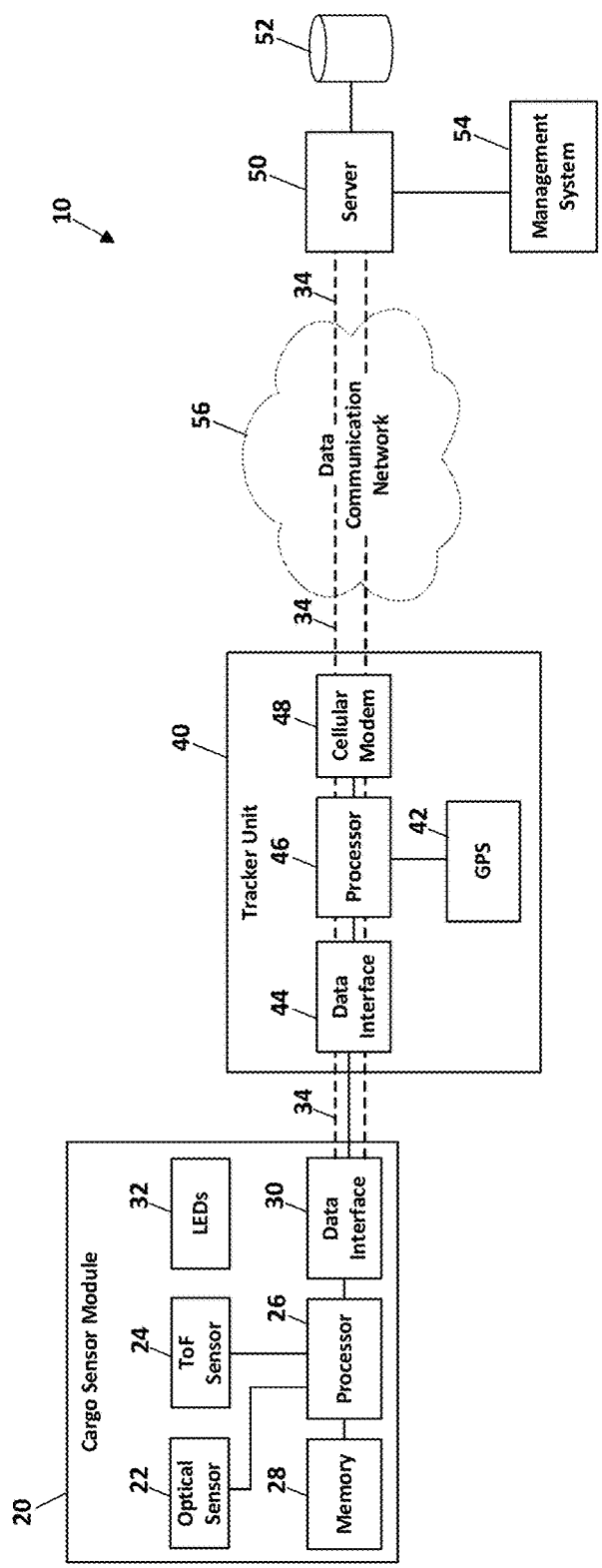
FIGS. 1 and 2 depict a cargo sensing system according to an embodiment of the invention.
Figure 2:
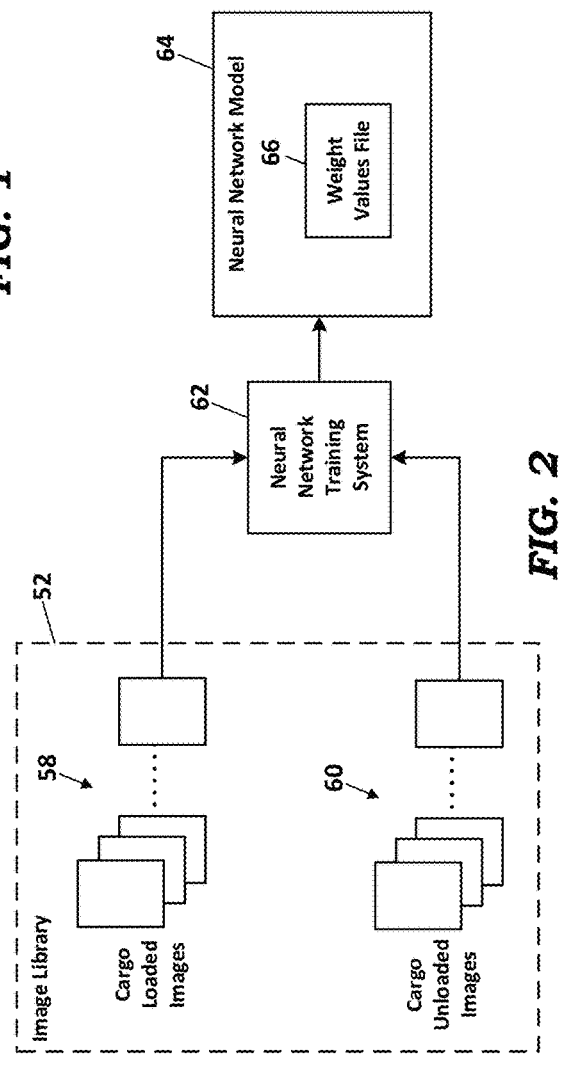
Figure 3:
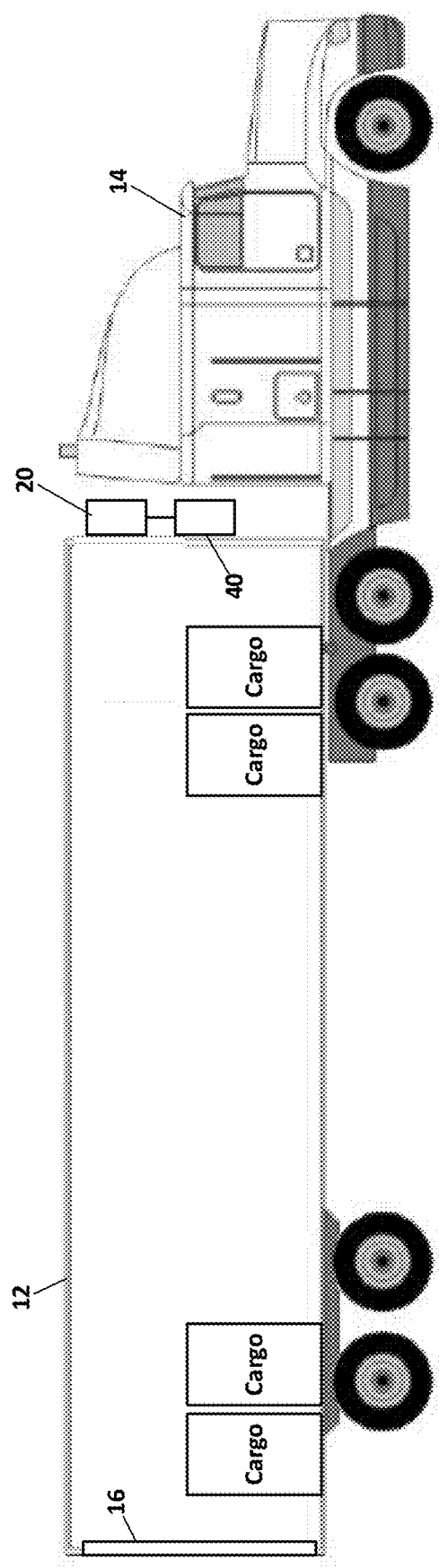
FIG. 3 depicts a typical cargo trailer attached to a tractor.

FIGS. 1 and 2 depicts an embodiment of a cargo sensing system 10. Generally, the system 10 includes one or more cargo sensor modules 20 and a tracker unit 40 mounted on a cargo container. In one embodiment depicted in FIG. 3, a cargo sensor module 20 and a tracker unit 40 are mounted on the front sheet (or nose) of the trailer 12. As shown in FIG. 1, each cargo sensor module 20 includes one or more optical imaging sensors 22, one or more optional distance sensors 24, memory 28 (such as local persistent flash storage and dynamic memory storage), a processor 26, a local data interface 30, and one or more illumination LEDs 32, all disposed on or within a cargo sensor module housing. In a preferred embodiment, the processor 26 runs a Linux or other operating system, which provides the framework for the software to run as described herein.

In some embodiments, a hole is drilled in the front sheet of the trailer, through which the optical imaging sensor 22 of the cargo sensor module 20 "sees" the interior of the trailer's cargo compartment. The processor 26 communicates with and controls the imaging sensor 22 to capture images of the inside of the trailer 12. The processor 26 also controls the illumination LEDs 32 to illuminate the interior of a trailer 12 when the doors are closed, or when the interior of the trailer 12 is otherwise not illuminated. In a preferred embodiment, the imaging sensor 22 is sensitive to infrared (IR) frequencies, and the illumination LEDs 32 emit light at a corresponding or similar IR frequency.

In a preferred embodiment, the optional distance sensor 24 is a laser-ranging time-of-flight (ToF) sensor, such as the ST Micro VL53L1X manufactured by ST Microelectronics. This secondary sensor 24 is generally limited to a short-range (about 3-5 meters) and provides additional information to the processor 26 regarding the load status of the trailer 12.

Sensor data generated by the sensor module 20 are provided to the trailer tracker unit 40 and/or the backend server 50 for processing as described hereinafter. Generally, the tracker unit 40 monitors the location and health of the trailer 12, sends commands the cargo sensor module 20 to detect the contents of the trailer, and sends information regarding the current cargo loading state of the trailer 12 to the server 50 based on cargo detected using the sensor module 20. The tracker unit 40 preferably includes a processor 46, GPS receiver electronics 42 for determining location coordinates of the trailer 20, and a wireless data modem 48 for communicating with a backend server 50, and a local data interface 44 for communicating with the local data interface 30 of the sensor module 20. The local data interfaces 30 and 44 may each comprise one or more interfaces to implement wired communications protocols, such as Inter-integrated Circuit (I2C), Serial Peripheral Interface (SPI), Universal Asynchronous Receiver/Transmitter (UART), or Ethernet, or to implement wireless communications protocols, such as Wi-Fi, Bluetooth® short-range wireless technology, or Bluetooth® Low Energy short-range wireless technology. The tracker unit 18 may also interface with multiple external sensors, such as door sensors and temperature sensors.

The cargo sensing system 10 as described herein is operable to detect cargo with no prior knowledge of what is loaded in the trailer 12. Thus, the system 10 is operable to detect the cargo load in any trailer type, regardless of whether the door is open or closed, or whether the trailer has a transparent roof or minor damage on the walls, floor or roof.

Figure 5:
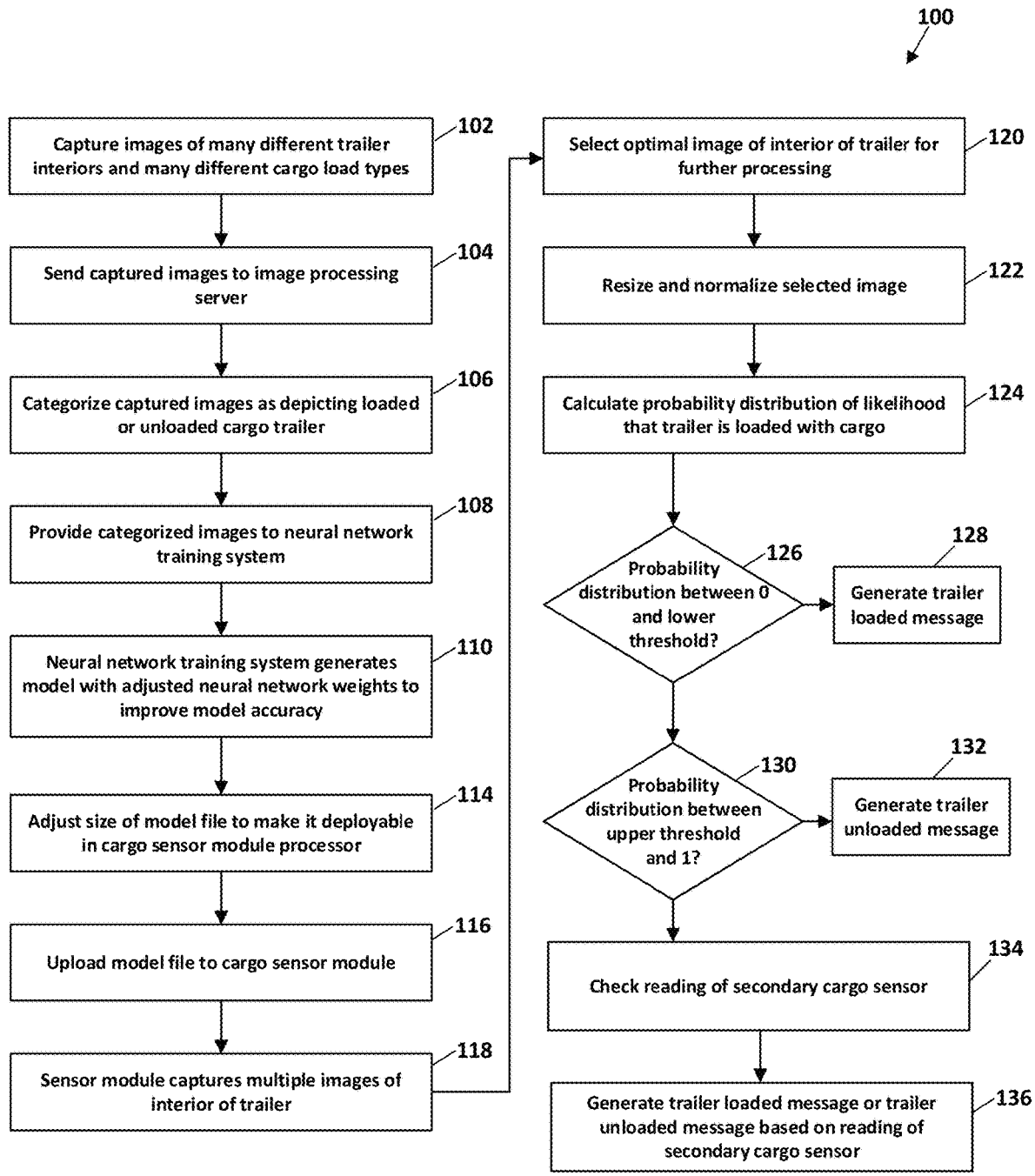
FIG. 5 depicts a process for sensing cargo in a cargo container according to a preferred embodiment.

FIG. 5 depicts a preferred embodiment of a process for determining a cargo load status for a cargo trailer or other cargo container. As described in more detail hereinafter, some steps in the process are directed to training a convolutional neural network, and some steps are directed to using the trained neural network to determine the cargo load status. To facilitate the training of the neural network, a large number of images of loaded and unloaded trailers 12 are captured using sensor modules 20 on hundreds of trailers (step 102), and the captured images are uploaded to an image library 52 (FIG. 1) for processing by the image processing server 50 (step 104). These images are preferably delivered from each cargo sensor module 20 through its associated tracker unit 40 to the server 50 (or another server) through an Internet Protocol (IP) tunnel 34. Creation of such an IP tunnel is well known in the art. Using this technique, information can be delivered scalably and flexibly from the cargo sensor module 20 through the tracker unit 40 without requiring extensive changes in the tracker unit's operational software, other than the ability to set up the tunnel.

By storing images locally and providing the IP tunnel 34 to send the images to a backend server, additional information that is valuable to the customer can be made available. For example, if the customer determines that the trailer has been damaged within a certain period of time, the customer can command the cargo sensor module 20 to upload images that were captured at about the same time that they believe the trailer was damaged, and collect information from the tracker unit 40 indicating who was in control of the trailer when it was damaged, and potentially indicating how it was damaged.

Once a significant number of images have been uploaded to the image library 52, some or all of the images are categorized as "loaded" (indicating cargo is present) or "unloaded" (indicating no cargo is present) (step 106). Categorization may be handled by humans reviewing the images, or by artificial intelligence. As shown in FIG. 2, the categorized images 58 and 60 are provided to a machine learning system 62 which may be executed on the server 50 or another processor dedicated to that purpose (step 108). In a preferred embodiment, the machine learning system 62 is implemented by the TensorFlow machine learning framework. However, it will be appreciated that any similar neural network learning framework may be used for this purpose.

With continued reference to FIG. 5, after receiving the untrained (empty/skeleton) convolutional network and the categorized images 58 and 60, the machine learning system 62 generates a model file 64 that includes a neural network, weights, and biases value file 66, and the system 62 adjusts the weight and bias values in the file 66 to achieve the best accuracy (step 110). As will be appreciated by one of ordinary skill in the art, the weight values represent the strength of connections between nodes in a neural network, and bias values are constants used in adjusting outputs. This process is generally referred to as training, and the output of training process is referred to as a model or model file that consists of weights and biases.

In a preferred embodiment, the model file 64 undergoes a post-processing step to reduce its size and make it deployable in the processor of the cargo sensor module 20. In one embodiment, the size of the model 64 is reduced by reducing the number of significant digits in the weight values, reducing the entropy of the entire file, and making it more compressible. Upon demand, the model file 64 is uploaded through the tunnel 34 to memory 28 of the cargo sensor module 20 (step 116). Once the processor 26 of the cargo sensor 20 is properly configured, the processor 26 uses the model file 64 to provide an indication of the trailer load status as described hereinafter.

Upon receipt of a command from the tracker unit 40 or the server 50, the optical sensor 22 in the cargo sensor module 20 captures multiple images of the interior of the trailer 12 (step 118). In a preferred embodiment, the multiple images are captured with differing exposure times or differing levels of illumination or both. The images are analyzed by image processing software running on the processor 26 to select an optimal image for further processing (step 120). In various embodiments, the optimal image is chosen based on the highest brightness, or the highest brightness with some limited number of saturated pixels (ones of maximum value). The selected optimal image is then resized and normalized for compatibility with the input layer of the neural network (step 122). Based on analysis of the resized and normalized image, the neural network running on the processor 26 calculates a probability distribution value indicating the likelihood that cargo is present in the trailer (step 124).

Figure 4:
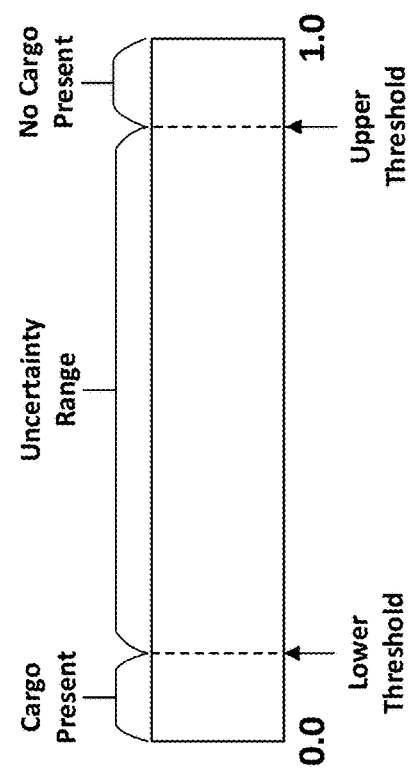
FIG. 4 depicts a graphical representation of a probability distribution indicating the probability of the presence of cargo in a cargo container.

As depicted in FIG. 4, a probability value near zero is a strong indication that the cargo is present in the trailer, whereas a probability value near one is a strong indication that no cargo is present. In some embodiments, if the probability value is in an uncertainty range—greater than a lower threshold value and less than an upper threshold value—this indicates that the neural network could not make a meaningful recommendation regarding the presence or absence of cargo. In that situation, software running on the processor 26 acquires distance information from the secondary sensor to determine whether cargo is present.

Thus, with reference again to FIG. 5, if the probability value is greater than or equal to zero but less than or equal to the lower threshold value (step 126), the processor 26 generates a trailer loaded message (step 128). If the probability value is greater than or equal to the upper threshold value but less than or equal to one (step 130), the processor 26 generates a trailer unloaded message (step 132). If the probability value is greater than the lower threshold value and less than the upper threshold value, the neural network has too much uncertainty regarding the cargo loading status. In this case, the processor 26 acquires the distance information from the secondary sensor (134), and generates a trailer loaded message or trailer unloaded message based on the distance information (step 136).

In some embodiments, if the probability value falls in the range between the lower threshold value and the upper threshold value, the selected captured image (from step 120) is flagged for upload to the image library 52 for categorization and use in a future machine learning process (step 108).

The presence of the IP tunnel 34 and the secondary shortrange distance sensor 24 allow several inventive applications. In one embodiment, if the neural network renders an uncertain ruling regarding whether the image shows the presence or absence of cargo in the trailer, the secondary shortrange distance sensor 24 may be queried to detect the presence of cargo. The information from the short-range sensor 24 may be sent over the tunnel 34 to the server 50 along with the associated image from the optical sensor 22. The image may then be added to the image library 52 for use in the training system 62, which generates a new model file 66 (new model file 66) for upload to the cargo sensor module 20. In this way, the detection accuracy of the neural network continuously improves as the image library 52 grows larger.

As mentioned above, in an exemplary embodiment, use of the short-range secondary sensor 24 allows a cargo sensor module 20 to be deployed even before a significant number of images have been added to the image library 52. As the cargo sensor module 20 successfully reports cargo loading status using the short-range sensor 24, it also gathers associated images and sends them to the server 50 for analysis and inclusion in the image library 52 for use by the machine learning system 62.

The presence of the short-range secondary sensor 24 provides additional advantages. In one preferred embodiment, if the secondary sensor 24 measures a valid distance value between a predetermined short threshold and a predetermined long threshold, then the system 10 understands that the secondary sensor 24 has properly detected cargo in the trailer, and thus the cargo state is loaded. In this case, the energy and memory required to capture an image using the optical sensor 22 and the energy needed to activate the illuminating LEDs 32 need not be expended. The load status result is communicated to the server 50 sooner, and the amount of overall energy consumed to provide the load status message is greatly reduced. If the secondary sensor 24 measures a distance value outside the threshold range specified, then the image and neural network processing is used to determine the load status.

In another preferred embodiment, if a malfunction in the system 10 is detected or suspected, information from the secondary shortrange sensor 24 and captured images from the optical sensor 22 can be compared to ascertain what may be causing the system malfunction, such as a mis-mounted or failed sensor.

In some embodiments, images captured by the optical sensor 22 may be processed and classified as indicating a "trailer door open" or "trailer door closed" condition. This classification may be made by the neural network after it has been trained in the same manner that it was trained to recognize "loaded" and "unloaded" cargo conditions. Using images showing open and closed door conditions, the neural network model file 64 may be created and the corresponding model file 66 may be generated so that images captured by the optical sensor 22 can be processed to determine the state of the door 16 in the back of the trailer 12.

In some embodiments, the system 10 may be used to detect specific objects. For example, the neural network may be trained to recognize humans. If a human is detected within the cargo container and the door is detected to be closed, the system 10 may generate an alert message indicating that a person is trapped or hiding inside the cargo container. In another example, the neural network may be trained to detect a specific type or shape of cargo that may be important, expensive, or illegal, or otherwise worthy of generating an alert to the user.

In preferred embodiments, the optical sensor 22 is mounted in the front of the trailer 12. However, in other embodiments it may be mounted in the back of the trailer or on the door 16. In some embodiments, the optical sensor 22 may be disposed remotely from the cargo sensor module 20, and connected via a wired or wireless interface to the processor 26. The optical sensor 22 may also be integrated into the tracker unit 40 to provide a unified cargo sensor and tracker system. In such an embodiment, functions of the processor 26 may be performed by the tracker processor 46 to reduce system cost, power consumption, and physical size.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An apparatus for detecting cargo within a cargo container, the apparatus comprising:
   an optical sensor that captures an image of an interior space within the cargo container;
   memory that stores a model file; and
   a processor that accesses the model file from the memory and processes the image from the optical sensor based on the model file to determine a first cargo loading status of the cargo container, and wherein processing of the image includes:
     calculating a probability distribution of likelihood that the cargo container is loaded with cargo, wherein the probability distribution has a value from zero to one;
     determining that the first cargo loading status is loaded if the probability distribution is between zero and a lower threshold value, and
     determining that the first cargo loading status is unloaded if the probability distribution is between an upper threshold value and one.

2. The apparatus of claim 1 further comprising a network interface for communicating cargo information via a data communication network from the apparatus to a server computer.

3. The apparatus of claim 2 wherein the cargo information includes one or more of the first cargo loading status and the image from the optical sensor.

4. The apparatus of claim 1 further comprising a distance sensor that generates distance information indicative of a presence of cargo within the interior space of the cargo container.

5. The apparatus of claim 4 wherein the processor receives the distance information and determines a second cargo loading status based at least in part on the distance information.

6. The apparatus of claim 5 wherein the processor compares the first cargo loading status to the second cargo loading status, and generates an alert message if the first cargo loading status is inconsistent with the second cargo loading status.

7. The apparatus of claim 6 further comprising a network interface for communicating cargo information via a data communication network from the apparatus to a server computer, wherein the cargo information includes one or more of the alert message, the first cargo loading status, the second cargo loading status, the image from the optical sensor, and the distance information.

8. A method for detecting cargo within a cargo container, the method comprising:
   (a) capturing one or more images of an interior space of the cargo container using the one or more image sensors mounted within or on the cargo container;

(b) processing the one or more images based on a model file to determine a first cargo loading status of the cargo container, wherein the processing is performed by a processor disposed within or on the cargo container, and wherein the processing includes:
calculating a probability distribution of likelihood that the cargo container is loaded with cargo, wherein the probability distribution has a value of zero to one;
determining that the first cargo loading status is loaded if the value of the probability distribution is between zero and a lower threshold value, and
determining that the first cargo loading status is unloaded if the value of the probability distribution is between an upper threshold value and one; and
(c) communicating cargo information via a data communication network to a server computer that is remote from the cargo container, wherein the cargo information includes one or both of the first cargo loading status and at least one of the images.

9. The method of claim 8 further comprising:
(d) generating distance information indicative of a presence of cargo within the interior space of the cargo container using a distance sensor disposed on or within the cargo container; and
(e) determining a second cargo loading status based at least in part on the distance information,
wherein step (c) comprises communicating the cargo information including the second cargo loading status.

10. The method of claim 9 further comprising:
(f) comparing the first cargo loading status to the second cargo loading status; and
(g) generating an alert message if the first cargo loading status is inconsistent with the second cargo loading status,
wherein step (c) comprises communicating the cargo information including the alert message.

11. The method of claim 8 further comprising:
(d) prior to step (b), capturing a plurality of images of interior spaces of a plurality of cargo containers using image sensors mounted within or on the plurality of cargo containers;
(e) prior to step (b), generating image categorization information based on categorizing each of the plurality of images as depicting either a loaded cargo container or an unloaded cargo container; and
(f) prior to step (b), generating a neural network model based on the image categorization information, wherein the neural network model incorporates the model file,
wherein step (b) comprises processing the one or more images using the neural network model.

12. The method of claim 8 wherein step (b) includes selecting an optimal image from the one or more images for processing.

13. The method of claim 8 further comprising, if the value of the probability distribution is between the lower threshold value and the upper threshold value:
(d) generating distance information indicative of a presence of cargo within the interior space of the cargo container using a distance sensor disposed on or within the cargo container; and
(e) determining a second cargo loading status based at least in part on the distance information,
wherein step (c) comprises communicating the cargo information including the second cargo loading status.

14. A cargo sensor module for determining a cargo loading status of a cargo container, the cargo sensor module comprising:
an optical sensor that captures an image of an interior space within the cargo container;
a distance sensor that generates distance information indicative of a presence of cargo within the interior space of the cargo container;
memory that stores a model file;
a processor that executes operational instructions to:
access the model file from the memory and process the image from the optical sensor based on the model file to determine a first cargo loading status of the cargo container, wherein processing of the image includes:
calculating a probability distribution of likelihood that the cargo container is loaded with cargo, wherein the probability distribution has a value from zero to one;
determining that the first cargo loading status is loaded if the probability distribution is between zero and a lower threshold value, and
determining that the first cargo loading status is unloaded if the probability distribution is between an upper threshold value and one;
receive the distance information and determine a second cargo loading status based at least in part on the distance information; and
compare the first cargo loading status to the second cargo loading status, and generate an alert message if the first cargo loading status is inconsistent with the second cargo loading status; and
a network interface for communicating cargo information via a data communication network from the apparatus to a server computer, wherein the cargo information includes one or more of the alert message, the first cargo loading status, the second cargo loading status, the image from the optical sensor, and the distance information.

* * * * *